US012559359B2

(12) United States Patent
Kim et al.

(10) Patent No.: US 12,559,359 B2
(45) Date of Patent: Feb. 24, 2026

(54) BEDDING FILLER USING GEL CUSHION

(71) Applicant: BULLSONE CO., LTD, Seoul (KR)

(72) Inventors: Young Jin Kim, Incheon (KR); Jeong Su Kim, Incheon (KR); Byoung Jun Seo, Incheon (KR); Byung Hyun Kim, Seoul (KR)

(73) Assignee: BULLSONE CO., LTD, Seoul (KR)

( * ) Notice: Subject to any disclaimer, the term of this patent is extended or adjusted under 35 U.S.C. 154(b) by 205 days.

(21) Appl. No.: 18/286,643

(22) PCT Filed: Apr. 5, 2022

(86) PCT No.: PCT/KR2022/004838

§ 371 (c)(1),
(2) Date: Oct. 12, 2023

(87) PCT Pub. No.: WO2022/220462

PCT Pub. Date: Oct. 20, 2022

(65) Prior Publication Data

US 2024/0217805 A1 Jul. 4, 2024

(30) Foreign Application Priority Data

Apr. 16, 2021 (KR) ........................ 10-2021-0049575

(51) Int. Cl.
*B68G 5/00* (2006.01)
*B68G 11/04* (2006.01)

(52) U.S. Cl.
CPC ................ *B68G 5/00* (2013.01); *B68G 11/04* (2013.01)

(58) Field of Classification Search
CPC .................................. B68G 5/00; B68G 11/04
USPC .............................................................. 5/655
See application file for complete search history.

(56) References Cited

U.S. PATENT DOCUMENTS 5,617,595 A 4/1997 Landi et al.
2003/0061663 A1* 4/2003 Lampel .................. A47C 27/15 428/116

FOREIGN PATENT DOCUMENTS

| | | | | |
|---|---|---|---|---|
| CN | 107105891 | A | 8/2017 | |
| CN | 111565606 | A | 8/2020 | |
| DE | 202020103434 | U1 * | 6/2020 | ............. A47C 27/20 |
| JP | 2004321229 | A | 11/2004 | |
| JP | 3140168 | U | 3/2008 | |
| JP | 2009270082 | A | 11/2009 | |
| KR | 20050045819 | A | 5/2005 | |
| KR | 20160068473 | A | 6/2016 | |
| KR | 20200084346 | A | 7/2020 | |

(Continued)

OTHER PUBLICATIONS

International Search Report fo applicaiton No. PCT/KR2022/004838.

*Primary Examiner* — Justin C Mikowski
*Assistant Examiner* — Joseane E. Tejada
(74) *Attorney, Agent, or Firm* — Lando & Anastasi, LLP

(57) ABSTRACT

A bedding filler using gel cushion is disclosed. A bedding filler using a gel cushion is formed of a material having fluidity and elasticity and includes: a gel structure having a honeycomb structure; and a cushion bonded to the gel structure, wherein the gel structure is configured to include a plurality of barrier ribs forming through-holes having a downwardly recessed regular hexagonal cross-section, and an adhesive medium provided at the bottom of the barrier ribs.

8 Claims, 3 Drawing Sheets

(56) References Cited

FOREIGN PATENT DOCUMENTS

TW 202007319 A 2/2020

* cited by examiner

BEDDING FILLER USING GEL CUSHION

TECHNICAL FIELD

The following embodiments relate to a bedding filler using a gel cushion.

BACKGROUND ART

A cushion used for a bed or a sitting mat is formed of a material that provides comfort to the human body by supporting and distributing a person's weight. The materials used for such a cushion are required to have properties such as softness, compressibility, vibration absorption, dehumidification, deformation followability, and durability. Materials that satisfy these properties are cotton, synthetic fibers, synthetic resin foam, sponge rubber, and semi-rigid materials, or a gel structure. Among them, the gel structure is becoming more common because of excellent body pressure dispersibility, breathability, durability, and hygiene safety.

For the gel structure, a method of manufacturing a gel structure by performing injection molding into a hexagonal columnar shape having a most geometrically stable structure is widely known. However, the gel structure having a general hexagonal columnar shape has a problem in that it is not easy to remove the gel structure from a mold, resulting in low productivity and poor molding completeness. When it is manufactured to have an increased thickness of a barrier rib in order to solve the above problem, seating pressure performance is degraded.

In addition, the gel structure having the hexagonal columnar structure has a limitation in increasing a height of a column of a barrier rib due to limitations of the manufacturing method, and therefore, a cushion is manufactured by bonding a separate cushion material to realize a sufficient height. However, it is difficult to directly adhere the gel structure to the cushion material, and thus, they are usually adhered using an adhesive medium. However, in order to complete the gel structure, the adhesive medium, and the cushion material as one product, an adhesion operation is required between each material. Even if each material is adhered to each other, when a pressure is applied, the cushion material laminated with double materials changes in its shape and has a severe deformation of an adhesion surface due to the characteristics of the cushion material. Also, since the force is applied in various directions, sufficient fixability may not be provided only by the simple adhesion, and the materials may be detached. This has a problem of greatly reducing the productivity of a product. In addition, there is a problem that, as the number of adhesion portions increases, the possibility of defects in a product such as poor adhesion increases.

The above description has been possessed or acquired by the inventor(s) in the course of conceiving the present disclosure and is not necessarily an art publicly known before the present application is filed.

DISCLOSURE OF THE INVENTION

Technical Goals

An object of an embodiment is to provide a bedding filler using a gel cushion that improves productivity by integrally manufacturing an adhesive medium and a gel structure and has a structure easily removable from a mold.

The technical tasks obtainable from the present disclosure are non-limited by the above-mentioned technical tasks. And, other unmentioned technical tasks can be clearly understood from the following description by those having ordinary skill in the technical field to which the present disclosure pertains.

Technical Solutions

A bedding filler using a gel cushion according to an embodiment is disclosed. The bedding filler using the gel cushion includes a gel structure formed of a material having fluidity and elasticity and having a honeycomb structure, and a cushion bonded to the gel structure. The gel structure includes a plurality of barrier ribs forming through-holes each having a downwardly recessed regular hexagonal cross-section, and an adhesive medium provided at a lower end of the barrier ribs.

The barrier rib may be formed to have an upper thickness of 1 millimeters (mm) to 3 mm.

The through-hole may be formed to have an upper diameter greater than a lower diameter.

The upper diameter of the through-hole may be formed to be 8 mm to 12 mm.

A polyethylene terephthalate (PET) sheet or a polyurethane (PU) sheet may be used for the adhesive medium.

At least one or more adhesive layers may be formed between the gel structure and the cushion.

The cushion may be formed of a urethane, polyethylene (PE), polypropylene (PP), or latex material.

The cushion may be formed with a groove corresponding to the gel structure.

Effects

As described above, according to the embodiments, a method of manufacturing a bedding filler using a gel cushion may improve productivity by reducing a manufacturing process by integrating the gel structure and the adhesive medium, and realizes easy removal from a mold.

The effects of the bedding filler using the cushion according to an embodiment are not limited to the above-mentioned effects, and other unmentioned effects can be clearly understood from the following description by one of ordinary skill in the art.

Figure 1:
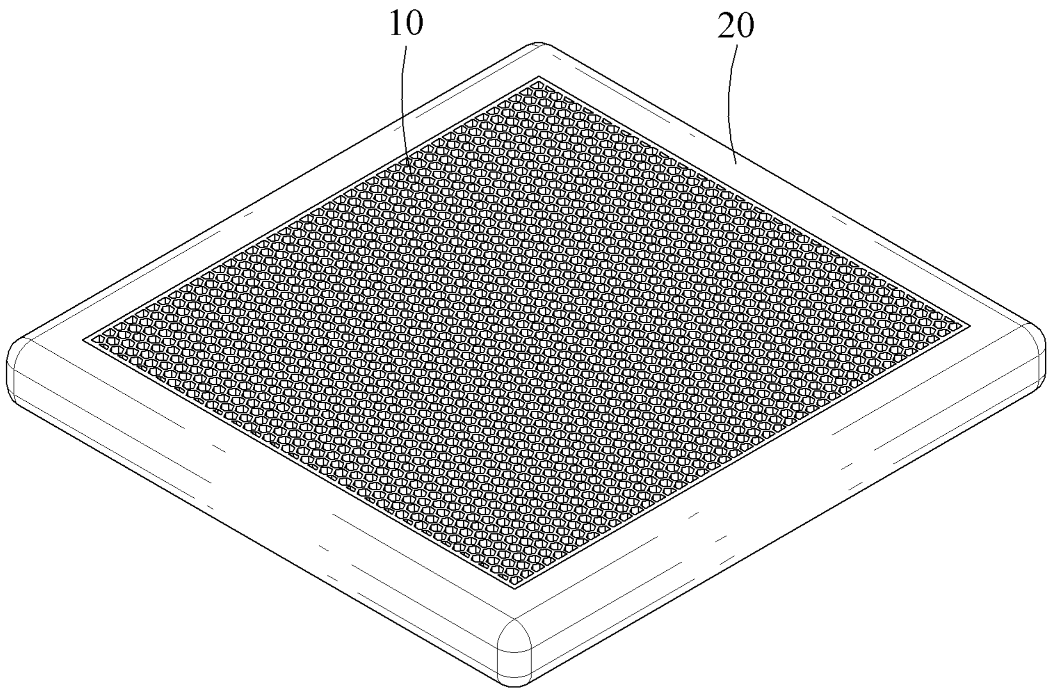
FIG. 1 is a perspective view of a bedding filler using a gel cushion according to an embodiment.

The accompanying drawings illustrate desired embodiments of the present disclosure and are provided together with the detailed description for better understanding of the technical idea of the present disclosure. Therefore, the present disclosure should not be construed as being limited to the embodiments set forth in the drawings.

BEST MODE FOR CARRYING OUT THE INVENTION

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

In addition, terms such as first, second, A, B, (a), (b), and the like may be used to describe components of the embodiments. These terms are used only for the purpose of discriminating one component from another component, and the nature, the sequences, or the orders of the components are not limited by the terms. It should be noted that if one component is described as being "connected", "coupled" or "joined" to another component, the former may be directly "connected," "coupled", and "joined" to the latter or "connected", "coupled", and "joined" to the latter via another component.

A component, which has the same common function as a component included in any one embodiment, will be described by using the same name in other embodiments. Unless otherwise described, the description on one embodiment may be applicable to another embodiment and thus, redundant description will be omitted for conciseness.

A bedding filler 1 using a gel cushion according to an embodiment will be described. FIG. 1 is a perspective view of the bedding filler 1 using the gel cushion according to an embodiment, FIG. 2 is a plan view of the bedding filler 1 using the gel cushion according to an embodiment, and FIG. 3 is a cross-sectional view taken along a line A-A' of FIG. 2.

Figure 2:
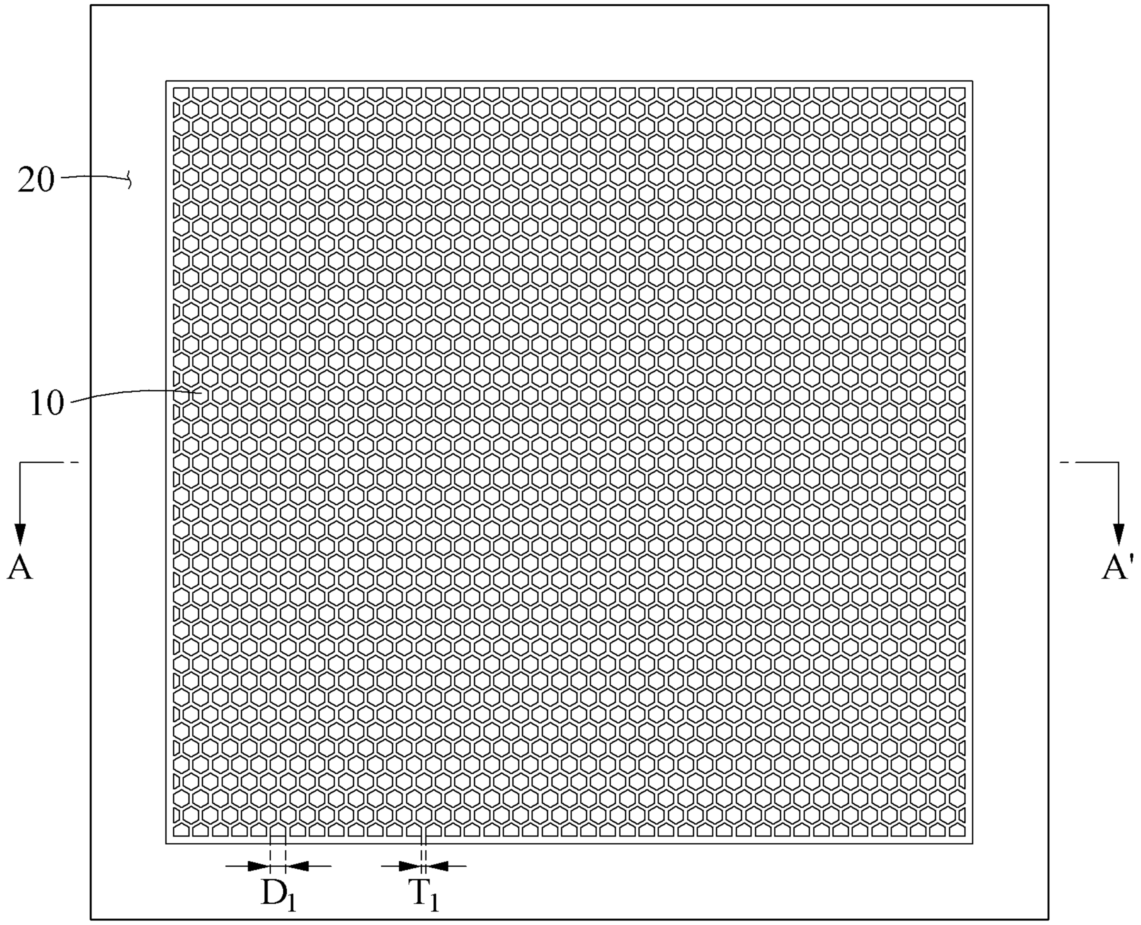
FIG. 2 is a plan view of a bedding filler using a gel cushion according to an embodiment.
Figure 3:
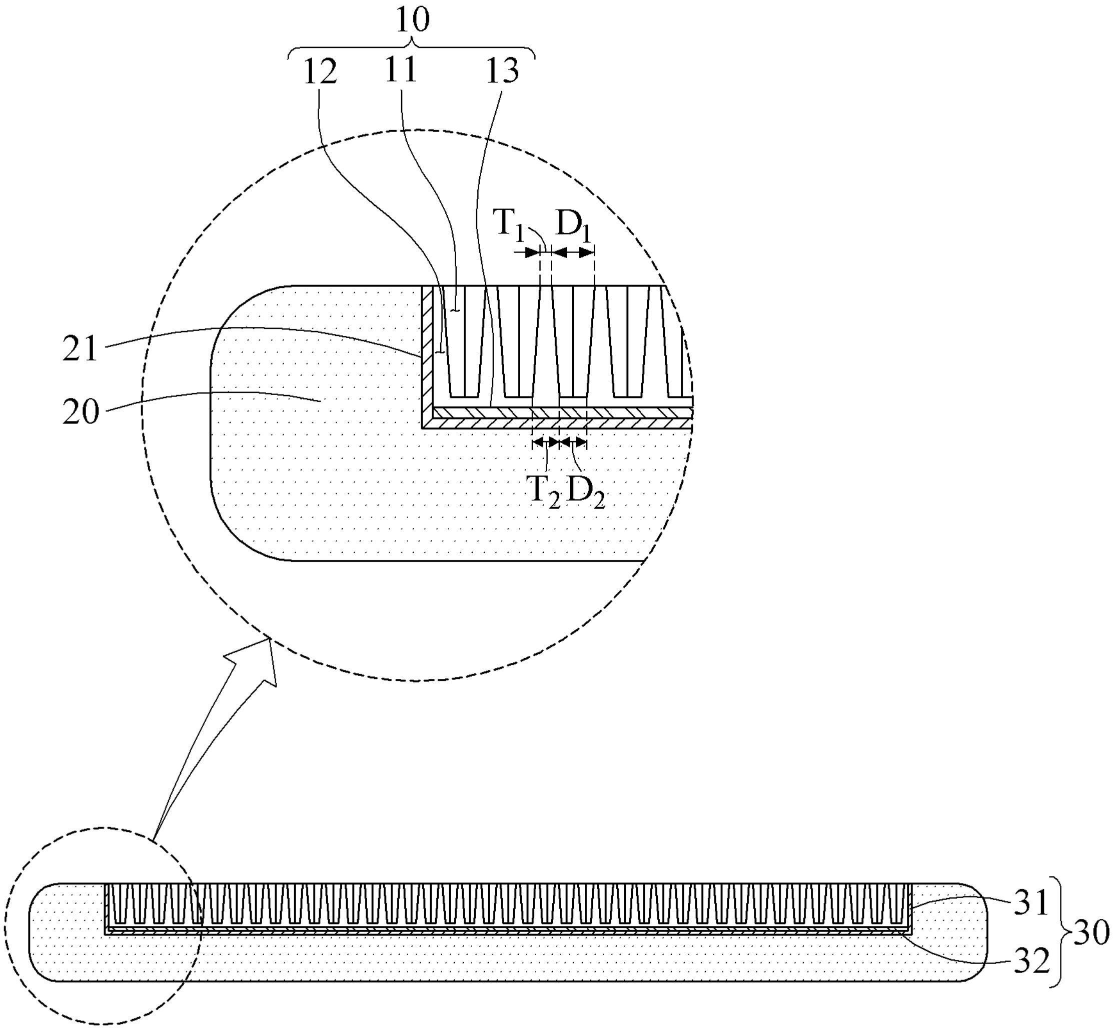
FIG. 3 is a cross-sectional view taken along a line A-A' of FIG. 2.

Referring to FIGS. 1 to 3, the bedding filler 1 using the gel cushion is formed of a material having fluidity and elasticity, and includes a gel structure 10 having a honeycomb structure, and a cushion 20. The gel structure 10 and the cushion 20 are bonded and integrally formed.

The gel structure 10 may be composed of a copolymer obtained by copolymerizing a polystyrene-based polymer and polypropylene. Here, the polystyrene-based polymer may have a three-block structure, such as a styrene-(ethylene/butylene)-styrene (SEBS) block copolymer or polystyrene-block-poly(ethylene-ethylene/propylene)-block polystyrene (SEEPS). In addition, the gel structure 10 may include an organic antibacterial agent or an inorganic antibacterial agent to have aromatherapy and antibacterial functions.

In addition, the cushion 20 may be formed of a urethane, polyethylene (PE), polypropylene (PP), or latex material, and may also be formed of various well-known natural or synthetic materials having elasticity and softness. The cushion 20 has a restoring force to gradually return to its original shape when it is pressed, and therefore, the pressure may be appropriately dispersed as a whole by the restoring force.

The gel structure 10 and the cushion 20 are bonded to each other and integrally formed by an adhesive medium 13 to be described below. At least one or more adhesive layers 30 may be formed between the gel structure 10 and the cushion 20, and a groove 21 having a size corresponding to a size of the gel structure 10 may be formed in the cushion 20 so that the gel structure 10 is inserted into and adhered to the groove 21.

The shape formed by bonding and integrating the gel structure 10 and the cushion 20 may be changed according to a user's body part supported by the gel structure 10 and the cushion 20, and is not limited to the drawings.

The gel structure 10 includes the plurality of barrier ribs 12 and the adhesive medium 13.

The gel structure 10 forms the plurality of barrier ribs 12 to form through-holes 11 having a downwardly recessed regular hexagonal cross-section. The plurality of barrier ribs 12 is continuously formed at predetermined intervals and has a honeycomb structure formed with a plurality of regular hexagonal through-holes 11. Since the barrier ribs 12 have the honeycomb structure formed with the plurality of regular hexagonal through-holes 11, air may smoothly flow inside the through-holes 11 and moisture and sweat may be effectively released, thereby providing thermal stability, and a body pressure may be equally dispersed to reduce a pressure applied to a certain part of the body, thereby improving seating comfort.

Here, an upper thickness $T_1$ of the barrier rib 12 may be formed to be 1 millimeters (mm) to 3 mm. The plurality of barrier ribs 12 is formed such that the thickness increases as it goes downward. Accordingly, the through-hole 11 formed between the barrier ribs 12 is formed to have an upper diameter $D_1$ greater than a lower diameter $D_2$, and is formed such that the diameter decreases as it goes downward. Here, the upper diameter $D_1$ of the through-hole 11 may be formed to be 8 mm to 12 mm.

As described above, the gel structure 10 in which the upper thickness $T_1$ of the barrier rib 12 is formed to be smaller than the lower thickness $T_2$ has an advantage of being easily separated from a mold during mold injection. In addition, when there is no difference between the upper thickness and the lower thickness of the barrier rib 12, the barrier ribs 12 are excessively biased to come into contact with each other due to a buckling phenomenon, and a seating pressure dispersing effect is deteriorated. However, as in an embodiment, when the upper thickness $T_1$ of the barrier rib 12 is formed to be smaller than the lower thickness $T_2$, the upper thickness $T_1$ of the barrier rib 12 in contact with the body of a seated person is formed thin, thereby providing soft seating comfort to the seated person, and the lower thickness $T_2$ of the barrier rib 12 in contact with the cushion 20 is formed thick, thereby exhibiting an effect of stably supporting the gel structure 10 from below.

The adhesive medium 13 is provided at a lower end of the barrier rib 12. A composition of the gel structure 10 and the adhesive medium 13 are integrated by a predetermined temperature and pressure inside a mold to have a predetermined shape. For example, the adhesive medium 13 may be integrated with the gel structure 10 by setting the adhesive medium 13 on a lower plate of the mold, and inserting and injecting the prepared composition of the gel structure 10 into the mold. Here, for the adhesive medium 13, a polyethylene terephthalate (PET) sheet or a polyurethane (PU) sheet may be used.

Since it is difficult to directly adhere the polypropylene-based polymer and polypropylene, which are main components of the gel structure 10, and the urethane, PE, PP, and latex materials, which are main components of the cushion 20, the adhesive medium 13 functions as an intermediate medium so that the gel structure 10 is able to be bonded to the cushion 20 formed of the urethane, PE, PP, and latex materials to be described below. As it is manufactured by integrating the gel structure 10 with the adhesive medium 13, there is no need to apply a separate adhesive between the gel structure 10 and the adhesive medium 13, which simplifies the manufacturing process, and the formation of the plurality of adhesive layers 30 may reduce defects such as poor adhesion that may occur.

At least one or more adhesive layers 30 is formed between the gel structure 10 and the cushion 20. For example, a first adhesive layer 31 may be formed by applying an adhesive to a lower surface of the gel structure 10 and bonded to the cushion 20. Alternatively, a second adhesive layer 32 may also be formed by applying an adhesive to a side surface of the gel structure 10, and the gel structure 10 may be inserted into and bonded to the cushion 20 formed with the groove 21 having a size corresponding to that of the gel structure 10.

Here, an end surface of the adhesive medium 13 comes into contact with an end surface of the cushion 20. The adhesive medium 13 has a function of connecting the gel structure 10 and the cushion 20. By bonding the gel structure 10 and the cushion 20, a height of the bedding filler 1 using the gel cushion may be adjusted. For example, the cushion 20 may be formed of a urethane, PE, PP, or latex material, and may also be formed of various well-known natural or synthetic materials having elasticity and softness. At least one or more adhesive layers 30 may be formed between the gel structure 10 and the cushion 20, and the groove 21 having a size corresponding to a size of the gel structure 10 may be formed in the cushion 20 so that the gel structure 10 is inserted into and adhered to the groove 21.

According to the embodiment, the bedding filler 1 using the gel cushion may be easily separated from the mold and improve seating pressure performance, by forming the upper thickness $T_1$ of the barrier rib 12 of the gel structure 10 to be narrower than the lower thickness $T_2$.

In addition, the bedding filler 1 using the gel cushion may improve the productivity by reducing the manufacturing process by integrating the gel structure 10 with the adhesive medium 13.

In addition, since the bedding filler 1 using the gel cushion is directly connected to the gel structure 10 and the adhesive medium 13, excellent adhesive strength is obtained so that the quality of a product may be improved.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The invention claimed is:

1. A bedding filler using a gel cushion, the bedding filler comprising:
- a gel structure formed of a material having fluidity and elasticity and having a honeycomb structure; and
- a cushion bonded to the gel structure,
- wherein the gel structure comprises:
  - a plurality of barrier ribs forming through-holes each having a downwardly recessed regular hexagonal cross-section and is formed such that the thickness increases as it goes downward, and
  - an adhesive medium provided at a lower end of the barrier ribs and integrated the gel structure inside a mold.

2. The bedding filler of claim 1, wherein the barrier rib is formed to have an upper thickness of 1 millimeters (mm) to 3 mm.

3. The bedding filler of claim 1, wherein the through-hole is formed to have an upper diameter greater than a lower diameter.

4. The bedding filler of claim 3, wherein the upper diameter of the through-hole is formed to be 8 mm to 12 mm.

5. The bedding filler of claim 1, wherein a polyethylene terephthalate (PET) sheet or a polyurethane (PU) sheet is used for the adhesive medium.

6. The bedding filler of claim 1, wherein at least one or more adhesive layers are formed between the gel structure and the cushion.

7. The bedding filler of claim 1, wherein the cushion is formed of a urethane, polyethylene (PE), polypropylene (PP), or latex material.

8. The bedding filler of claim 1, wherein the cushion is formed with a groove corresponding to the gel structure.

* * * * *